(12) United States Patent
Patel et al.

(10) Patent No.: US 11,959,589 B2
(45) Date of Patent: Apr. 16, 2024

(54) MOTOR DRIVEN PUMP FOR VARIABLE SPEED POWER GENERATION COOLING

(71) Applicant: Hamilton Sundstrand Corporation, Charlotte, NC (US)

(72) Inventors: Dhaval S. Patel, Schaumburg, IL (US); Aaron M. Finke, Janesville, WI (US); Glenn C. Lemmers, Jr., Loves Park, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/717,458

(22) Filed: Apr. 11, 2022

(65) Prior Publication Data

US 2023/0324002 A1    Oct. 12, 2023

(51) Int. Cl.
  *F16N 13/00*    (2006.01)
  *F01M 1/02*    (2006.01)
  *F04B 49/20*   (2006.01)

(52) U.S. Cl.
  CPC ............ *F16N 13/00* (2013.01); *F01M 1/02* (2013.01); *F04B 49/20* (2013.01)

(58) Field of Classification Search
  CPC ............ F16N 13/00; F01M 1/02; F04B 49/20
  See application file for complete search history.

(56) References Cited

U.S. PATENT DOCUMENTS

| | | | |
|---|---|---|---|
| 4,629,033 A | 12/1986 | Moore et al. | |
| 5,555,722 A * | 9/1996 | Mehr-Ayin | F02C 7/32 60/788 |
| 7,235,948 B2 | 6/2007 | Nakakita et al. | |
| 8,312,728 B2 | 11/2012 | Cloft et al. | |
| 8,618,765 B2 | 12/2013 | Sano et al. | |
| 8,827,656 B2 | 9/2014 | Sano et al. | |
| 9,103,438 B2 | 8/2015 | Caldwell et al. | |
| 10,590,853 B2 | 3/2020 | Suciu et al. | |
| 10,844,760 B2 | 11/2020 | Webb et al. | |
| 11,015,659 B2 | 5/2021 | Sethi et al. | |
| 2004/0090204 A1 | 5/2004 | McGinley | |

(Continued)

FOREIGN PATENT DOCUMENTS

| | | | | |
|---|---|---|---|---|
| EP | 3726012 A1 | 10/2020 | | |
| FR | 3075875 B1 * | 11/2019 | ............. | F01D 25/20 |
| GB | 2570656 A | 8/2019 | | |

OTHER PUBLICATIONS

Machine Translation of FR3075875B1 PDF File Name: "FR3075875B1_Machine_Translation.pdf".*

(Continued)

*Primary Examiner* — Grant Moubry
*Assistant Examiner* — Ruben Picon-Feliciano
(74) *Attorney, Agent, or Firm* — CANTOR COLBURN LLP

(57) ABSTRACT

An aircraft oil management system includes a generator, pump, and pump control system. The generator is mechanically coupled to a prime mover via a the rotor shaft and is configured to output three-phase power. The pump is mechanically decoupled from the rotor shaft and delivers oil to the generator. The pump control system drives the pump independent of a rotational speed of the rotor shaft.

11 Claims, 3 Drawing Sheets

(56) References Cited

U.S. PATENT DOCUMENTS

2011/0084638 A1\* 4/2011 Patel ..................... H02P 6/18
                                                    318/473
2016/0036367 A1  2/2016 McCall et al.
2016/0036450 A1  2/2016 McCall et al.
2022/0349466 A1\* 11/2022 Gaully ............... F16H 57/0442

OTHER PUBLICATIONS

Search Report issued in European Patent Application No. 23164467. 5; Application Filing Date Mar. 27, 2023; dated Sep. 11, 2023 (7 pages).

\* cited by examiner

MOTOR DRIVEN PUMP FOR VARIABLE SPEED POWER GENERATION COOLING

BACKGROUND

Embodiments of the present disclosure are directed generally to aircraft power systems, and more specifically, to a motor driven pump configured to cool an aircraft variable speed power generator.

Aircrafts commonly employ high power density aircraft generators. The aircraft generator utilizes an internal oil management system, which provides supplemental cooling to the generator main stator. The oil management system typically requires a hydraulic system that has a variable speed pump such as, for example a vane pump. The pump is driven by a gearset that is connected to the main rotor shaft, as a result, the pump operates across a speed range dictated by the aircraft engine.

BRIEF DESCRIPTION

According to a non-limiting embodiment, an aircraft power system comprises includes a generator, pump, and pump control system. The generator is mechanically coupled to a prime mover via a the rotor shaft and is configured to output three-phase power. The pump is mechanically decoupled from the rotor shaft and delivers oil to the generator. The pump control system is configured to drive the pump independent of a rotational speed of the rotor shaft.

In addition to one or more of the features described herein, or as an alternative, further embodiments may include a feature, wherein the pump outputs the oil independent of the speed of the rotor shaft.

In addition to one or more of the features described herein, or as an alternative, further embodiments may include a feature, wherein the pump control system actively controls operation of the pump across a wide speed range based on operation of the aircraft engine.

In addition to one or more of the features described herein, or as an alternative, further embodiments may include a feature, wherein the pump control system comprises a motor configured to drive the pump, a motor drive module configured to control operation of the motor; and a motor power supply configured to power one or both of the motor drive module and the motor.

In addition to one or more of the features described herein, or as an alternative, further embodiments may include a feature, wherein the system further comprises at least one sensor in signal communication with the motor drive module. The at least one sensor configured to measure an operating condition of the generator and to output a sensor signal indicative of the measured operating condition.

In addition to one or more of the features described herein, or as an alternative, further embodiments may include a feature, wherein the motor drive module actively controls the motor based on the sensor signal output from the at least one sensor.

In addition to one or more of the features described herein, or as an alternative, further embodiments may include a feature, wherein the motor drive module actively controls the motor by one or both of actively increasing an operating speed of the pump and actively decreasing the operating speed of the pump independently from a rotational forced applied by the rotor shaft onto the motor.

In addition to one or more of the features described herein, or as an alternative, further embodiments may include a feature, wherein the module drive module stores a look-up table (LUT) that indexes at least one operating parameter of the generator to a target oil flow to be input to the generator, and wherein the drive module actively controls the pump based on a comparison between the at least one index operating parameter and the measured operating condition indicated by the sensor signal indicative output from the at least one sensor.

According to yet another non-limiting embodiment, a method of controlling an aircraft power system comprises outputting three-phase power from a generator that is mechanically coupled to a prime mover via a the rotor shaft; delivering oil to the generator using a pump that is mechanically decoupled from the rotor shaft; and driving the pump independent of a rotational speed of the rotor shaft using a pump control system.

In addition to one or more of the features described herein, or as an alternative, further embodiments may include a feature, wherein the method further comprises outputting the oil from the pump independent of the speed of the rotor shaft.

In addition to one or more of the features described herein, or as an alternative, further embodiments may include a feature, wherein the method further comprises actively controlling operation of the pump using the control system based on operation of the aircraft engine.

In addition to one or more of the features described herein, or as an alternative, further embodiments may include a feature, wherein the method further comprises mechanically coupling the pump to a motor; outputting power from a motor power supply to one or both of the motor and a motor drive module; and controlling operation of the motor using the motor drive module.

In addition to one or more of the features described herein, or as an alternative, further embodiments may include a feature, wherein the method further comprise measuring an operating condition of the generator using at least one sensor in signal communication with the motor drive module; and outputting a sensor signal indicative of the measured operating condition.

In addition to one or more of the features described herein, or as an alternative, further embodiments may include a feature, wherein the method further comprises actively controlling the motor using the motor drive module based on the sensor signal output from the at least one sensor.

In addition to one or more of the features described herein, or as an alternative, further embodiments may include a feature, wherein actively controlling the motor further comprises actively increasing one or both of an operating speed of the pump and actively decreasing the operating speed of the pump independently from a rotational forced applied by the rotor shaft onto the motor.

In addition to one or more of the features described herein, or as an alternative, further embodiments may include a feature, wherein actively controlling the motor further comprises indexing in a look-up table (LUT) at least one operating parameter of the generator to a target oil flow to be input to the generator; comparing at least one index operating parameter and the measured operating condition indicated by the sensor signal indicative output from the at least one sensor; and actively controlling the pump based on the comparison.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
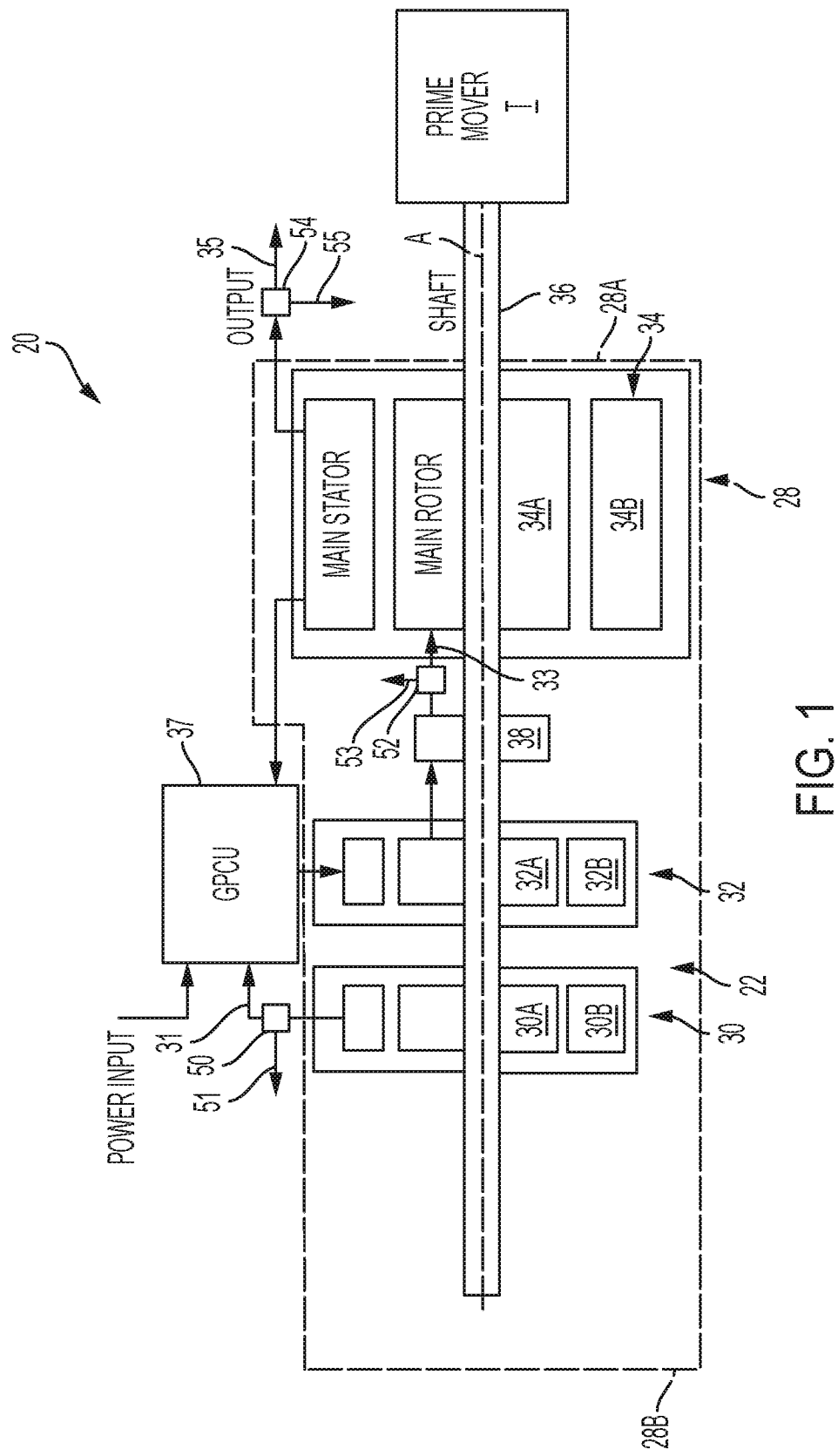
FIG. 1 is a sectional view of a starter-generator for a gas turbine engine according to a non-limiting embodiment.

A detailed description of one or more embodiments of the disclosed apparatus and method are presented herein by way of exemplification and not limitation with reference to the Figures. The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

Turning now to an overview of the technology related to the present disclosure, the variable speed pump employed in the oil system of the generator produces varying output flow dependent on its speed. To regulate the system pressure, a pressure regulating valve (PRV) is typically incorporated in the oil management system. The PRV is a passive operating component, which actuates using a spring mass system to regulate the flow of oil to the system by diverting some of the pump flow back to the pump inlet.

Because the PRV operates passively, it must be designed to satisfy various operating requirements of the both the oil management system and the generator. For instance, the PRV must be sized to limit the pressure to ensure that the system gets the proper cooling flow and the correct pressure, while also reducing pressure pulsations in the oil management system. The oil management system as a whole must also be sized for low speed scenarios to provide the proper cooling, while still sized to provide a large amount of flow at high speed due to its passive operation. These sizing and design constraints, however, introduce inefficiencies in the system by increasing machine windage and pump losses. In addition, the physical connection to the main rotor shaft forces the pump to be either placed near the main rotor shaft or employ idler gears in order to move the pump away from the main rotor shaft.

Various non-limiting embodiments of the present disclosure provides an oil management system that includes a pump control system configured to utilize speed, current, and temperature feedbacks to actively control operation of the pump across a wide speed range dictated by the aircraft engine. The pump control system includes a motor and a motor drive controller, which work together to actively control the pump. Accordingly, generator cooling can be actively increased or reduced in response to monitored operating conditions, thereby achieving more precise control of the oil delivery in the generator. The increased precision in oil delivery also reduces windages losses and allows for higher current densities with improved optimized cooling. The combination of the motor and motor drive controller also eliminates the need to employ various gearing and shrouds to drive the pump. The active operation of the pump that is achieved using the motor and motor drive controller also allows for omitting the PRV from the oil management system, which in turn eliminates pressure pulsations that are found in current generator oil management systems.

Turning now to FIG. 1, selected portions of a generator 20 is illustrated according to a non-limiting embodiment. Although the generator 20 is described in terms of an aircraft system, it should be appreciated that the generator 20 can be implemented in various other applications without departing from the scope of the invention.

The generator 20 as described herein can be used for starting a prime mover (T) such as a gas turbine engine, or for generating electrical current when being driven by the prime mover (T). The generator 20 may generally include a dynamoelectric portion 22 and a positive displacement pump 24, each contained within a common main housing assembly 28. Although a variable frequency generator (VFG) is illustrated in the disclosed embodiment, it should be understood that other generator systems such as an Integrated Drive Generator (IDG) will also benefit from the present teachings described herein.

The dynamoelectric portion 22 in the disclosed, non-limiting embodiment is a 3-phase machine that includes three machines 30, 32 and 34 mounted on a common rotor shaft 36 along an axis of rotation (A). Stator assemblies 30B, 32B, 34B of the three machines are installed in the main housing 28 and the three rotor assemblies 30A, 32A, 34A are installed on the rotor shaft 36. The main housing assembly 28 may be closed with a drive end (DE) cover assembly 28A through which the rotor shaft 36 extends and a non-drive end (NDE) cover assembly 28B.

The first machine 30 includes a permanent magnet generator (PMG) with a PMG rotor assembly 30A and PMG stator assembly 30B. The PMG stator assembly 30B supplies alternating current (AC) voltage 31 to power generator excitation, as well as power for other components of the electrical system. The second machine 32 includes a Main Exciter (ME) with a ME rotor assembly 32A and a stator assembly 32B. The ME receives field excitation from the PMG through a GGPCU (Generator and Ground Power Control Unit) 37. The output 33 of the ME rotor assembly 32A is supplied to a shaft mounted diode pack 38. The diode pack 38 may be divided into six diode groups to provide a 3-phase full wave bridge rectification that produces a direct current (DC) output. The DC output 33 of the diode pack 38 supplies power to the third machine 34. The DC output 33 includes and excitation current that energizes main rotor 34A. Rotation of the main rotor 34A energizes the main stator 34B to induce a three-phase alternating current therein, and in turn induces an output three-phase AC power 35.

In one or more non-limiting embodiments, the generator 20 employs various sensors including, but not limited to, a PMG voltage sensor 50, an exciter current sensor 52, and a main stator output current sensor 54. The PMG voltage sensor 50 outputs a voltage signal 51 indicative of an alternating current (AC) voltage, which is generated in response to the rotation of the PMG rotor assembly 30A and is delivered to the GGPCU 37. The rotation of the PMG rotor assembly 30A controls the behavior and output of the AC voltage 31. For instance, increasing the speed of the PMG rotor assembly 30A increases the frequency of the AC voltage 31, while decreasing the speed of the PMG rotor assembly 30A decreases the frequency of the AC voltage 31. Therefore, the voltage signal 51 output from the PMG voltage sensor 50 can be used (e.g., by a controller) to determine a rotational speed of the PMG 30 and in turn determine the speed of the generator 20. The exciter current sensor 52 outputs a current signal 51 indicative of the current level of the excitation current output 33 produced by the exciter 32. The main stator output current sensor 54 outputs a current signal 55 indicative of the current level flowing through the main stator 34B.

Figure 2:
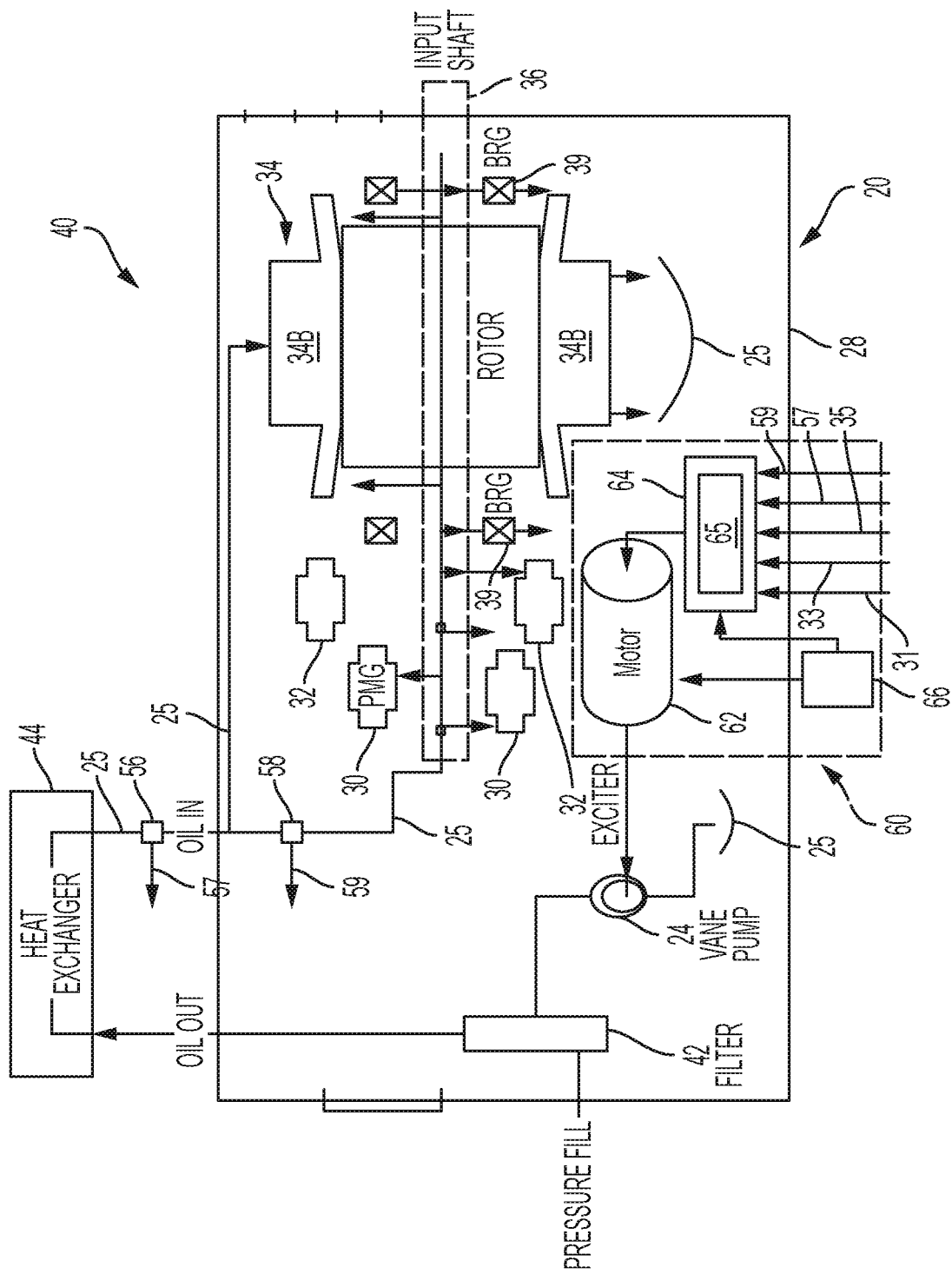
FIG. 2 is a block diagram illustrating an aircraft power system including an internal oil management system according to a non-limiting embodiment.

Referring now to FIG. 2, the generator 20 includes an internal oil management system 40 driven by the positive displacement pump 24. The oil 25 collects in the generator sump/reservoir and is removed by the positive displacement pump 24 within the housing assembly 28. The pump 24 produces the force that delivers cool oil 25 through galleries and passages around the dynamoelectric portion 22. According to one or more non-limiting embodiments, the pump is mechanically decoupled from the rotor shaft 36. In this manner, the speed of the pump 24 is not directly dependent on the rotational speed of the rotor shaft 36. That is, the operating speed of the pump 24 can be actively increased and/or decreased independently from a rotational forced applied by the rotor shaft 36 onto the pump 24.

In one or more non-limiting embodiments, the pump 24 supplies oil 25 through an internal filter 42 to an external heat exchanger 44. The heat exchanger 44 then supplies the oil 25 to the rotor shaft 36 via an oil input (Oil_In), which supplies oil 25 to the internal components of the generator 20. In one or more non-limiting embodiments, a pressure sensor 56 and an oil temperature sensor 58 are in fluid communication with the oil 25. The pressure sensor 56 outputs a pressure signal 57 indicative of the fluid pressure associated with the generator 20. The oil temperature sensor 58 outputs a temperature signal 59 indicating a temperature of the oil 25 input to the generator 20.

Oil through the center of the rotor shaft 36 cools the rotor windings and supplies oil 25 as a spray to cool the diodes, lubricate various bearings 39 and stator overhangs. Oil 25 is also communicated into oil grooves formed in the housing assembly 28 to flow oil 25 around the main stator assembly 34B.

With continued reference to FIG. 2, the internal oil management system 40 includes a pump control system 60 configured to actively control operation of the pump 24 across a wide speed range based on operation of the aircraft engine. The pump control system 60 is in signal communication with one or more of the sensors 50, 52, 54, 56, and 58 (collectively referred to as sensors 50-58) to obtain their output signals 51, 53, 55, 57, and 59 (collectively referred to as sensor output signals 51-59) indicative of the respective sensor measurements. The pump control system 60 includes a motor 62, a motor drive module 64, and a motor power supply 66. The motor 62 includes, but is not limited to, a three-phase induction machine, a brushless DC motor, a single phase induction motor and an AC permanent magnet (PM) motor could be utilized. In one or more non-limiting embodiments, the motor 62 is configured to drive the pump 24 independent of a rotational speed of the rotor shaft 36. That is, although the pump 24 can be actively controlled (e.g., pump speed increased or decreased) based, at least in part, on a rotational speed of the rotor shaft speed, the pump 24 is not directly dependent on the speed of the rotor shaft 36. Thus, the speed of the pump 24 can be actively adjusted (e.g., increased and decreased) independent of a current speed of the rotor shaft 36.

The motor drive module 64 is configured to control operation of the motor 62. The motor drive module 64 can include a motor driver and a controller that are implemented as a single unit. In other embodiments, the motor drive module 64 can be implemented as two individual units, i.e., a motor driver configured to drive the motor 62 and a separate hardware controller configured to control the motor driver. The motor driver included in the motor drive module 64 can include, but is not limited to, a three-phase Volts per Hertz motor driver, a vector-control motor driver, and a brushless DC-controlled motor driver. The controller can be implemented as an electronic hardware controller that includes memory and a processor configured to execute algorithms, computer-readable program instructions and look-up tables (LUTs) 65 stored in the memory.

The motor power supply 66 is configured to power one or both of the motor drive module 64 and the motor 62. In one or more non-limiting embodiments, the motor power supply 66 can include, but is not limited to, a battery, a VFG, or DC power provided by the GGPCU 37. The power generated by the power supply 66 can include 28 VDC or 270 VDC based on the aircraft architecture.

With continued reference to FIG. 2, the motor drive module 64 stores at least one LUT 65 that maps or indexes various measured parameters to a target oil flow to be input to the generator 20. In one or more non-limiting embodiments, the LUT 65 stores a plurality of different target oil flow parameters (e.g., gallons per minute or liters per minute) that correspond to one or more generator operating parameters. The generator operating parameters include, but are not limited to, generator speed, output PMG voltage 31, exciter current 33, main stator AC power output 35, generator fluid pressure, and oil temperature. PMG voltage sensor 50 outputs a voltage signal 51.

The motor drive module 64 is in signal communication with one or more of the sensors 50-58 to receive their respective sensor output signals 51-59. Accordingly, the motor drive module 64 is configured to compare current generator operating parameters indicated by the respective sensor output signals 51-59 to the indexed target oil flow parameters listed in the LUT 65, and actively control operation of the motor 62 (e.g., increase pump speed or decrease pump speed) to achieve the target oil flow that is mapped to the current generator operating parameters. In this manner, generator cooling can be actively increased or reduced in response to monitored operating conditions of the generator 20, thereby achieving more precise control of the oil delivery in the generator 20. The increased precision in oil delivery also reduces windages losses and allows for higher current densities with improved optimized cooling. The combination of the motor 62 and motor drive module 64 also allows for omitting various gearing and shrouds to drive the pump. The active operation of the pump 24 that is achieved using the pump control system 60 also allows for omitting the PRV from the oil management system 40, which in turn eliminates pressure pulsations that are found in conventional generator oil management systems.

Figure 3:
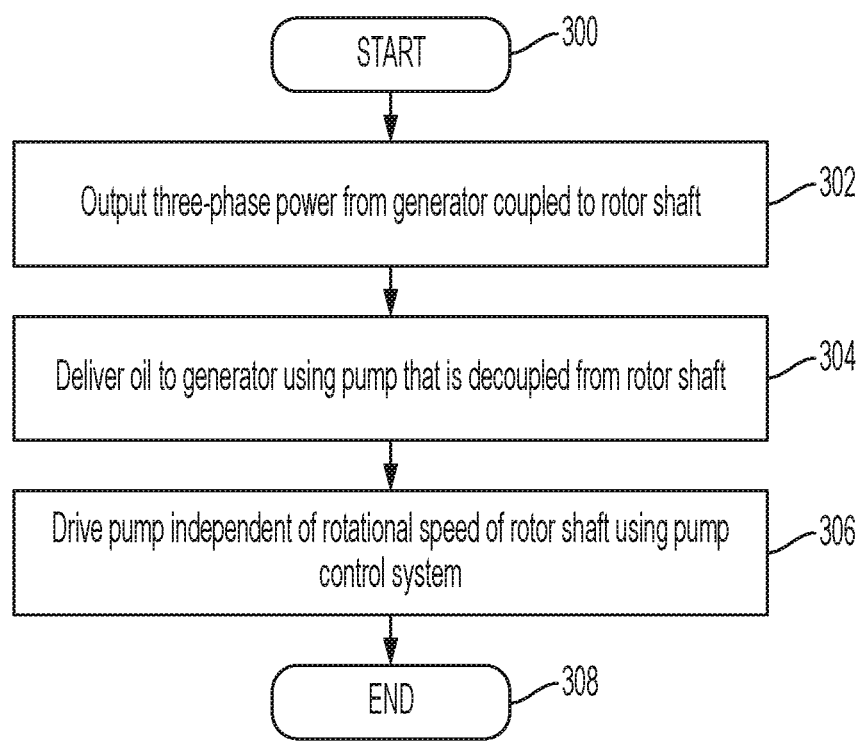
FIG. 3 is a flow diagram illustrating a method of controlling an aircraft power system according to a non-limiting embodiment.

Turing to FIG. 3, a flow diagram illustrates a method of controlling an aircraft power system according to a non-limiting embodiment. The method begins at operation 300, and at operation 302 three-phase power is output from a generator that is mechanically coupled to a prime mover via a rotor shaft of the aircraft. At operation 304, oil is delivered to the generator using a pump that is mechanically decoupled from the rotor shaft. At operation 306, the pump is driven independent of a rotational speed of the rotor shaft using a pump control system, and the method ends at operation 308.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:

1. An aircraft oil management system comprising:
    a generator mechanically coupled to a prime mover via a rotor shaft, the generator configured to output a three-phase power;
    a pump mechanically decoupled from the rotor shaft and configured to deliver oil to the generator; and
    a pump control system configured to drive the pump independent of a rotational speed of the rotor shaft, the pump control system comprising:
        a motor configured to drive the pump;
        a motor drive module configured to control operation of the motor;
        a motor power supply configured to power one or both of the motor drive module and the motor; and
        at least one sensor in signal communication with the motor drive module, the at least one sensor configured to measure an operating condition of the generator and to output a sensor signal indicative of the measured operating condition,
        wherein the motor drive module is configured to store a look-up table (LUT) that indexes at least one operating parameter of the generator to a target oil flow to be input to the generator, and wherein the motor drive module is configured to actively control the pump based on a comparison between the at least one index operating parameter and the measured operating condition indicated by the sensor signal indicative output from the at least one sensor.

2. The aircraft oil management system of claim 1, wherein the pump is configured to output the oil independent of the speed of the rotor shaft.

3. The aircraft oil management system of claim 1, wherein the motor drive module is configured to actively control the motor by one or both of actively increasing an operating speed of the pump and is configured to actively control decreasing the operating speed of the pump independently from a rotational forced applied by the rotor shaft onto the motor.

4. A method of controlling an aircraft oil management system, the method comprising:
    outputting three-phase power from a generator that is mechanically coupled to a prime mover via a rotor shaft;
    delivering oil to the generator using a pump that is mechanically decoupled from the rotor shaft;
    driving the pump independent of a rotational speed of the rotor shaft using a pump control system by mechanically coupling the pump to a motor, outputting power from a motor power supply to one or both of the motor and a motor drive module, and controlling operation of the motor using the motor drive module;
    measuring an operating condition of the generator using at least one sensor in signal communication with the motor drive module; and
    outputting a sensor signal indicative of the measured operating condition,
    analyzing, via the control system, a look-up table (LUT) that indexes at least one operating parameter of the generator to a target oil flow to be input to the generator;
    comparing at least one index operating parameter and the measured operating condition indicated by the sensor signal indicative output from the at least one sensor; and
    actively controlling the pump based on the comparison.

5. The method of claim 4, further comprising outputting the oil from the pump independent of the speed of the rotor shaft.

6. The method of claim 4, further comprising actively controlling operation of the pump using the control system based on operation of the aircraft engine.

7. The method of claim 4, wherein actively controlling the motor further comprises actively increasing one or both of an operating speed of the pump and actively decreasing the operating speed of the pump independently from a rotational forced applied by the rotor shaft onto the motor.

8. A method of controlling an aircraft oil management system, the method comprising:
    determining an index configured to map generator operating parameters of a generator to target oil flows to be input to the generator;
    storing the index in a motor drive module;
    delivering oil to the generator using a pump that is mechanically decoupled from a rotor shaft;
    outputting, from a sensor, a sensor signal indicative of a measured operating condition of the generator;
    comparing, by the motor drive module, the measured operating condition to at least one operating parameter included in the index; and
    based on the comparison, actively controlling the pump independent of a rotational speed of the rotor shaft.

9. The method of claim 8, wherein the index is included in a look-up table (LUT) stored the motor drive module.

10. The method of claim 9, wherein the generator operating parameters include one or a combination of generator speed, output permeant magnet (PMG) voltage, exciter current, main stator alternating current (AC) power output, generator fluid pressure, and oil temperature.

11. The method of claim 10, wherein active controlling further comprises:

actively increasing a speed or decreasing a speed of a motor configured to drive the pump to achieve the target oil flow that is indexed to the measured generator operating parameter.

\* \* \* \* \*